US006559645B2

(12) United States Patent
Arndt et al.

(10) Patent No.: US 6,559,645 B2
(45) Date of Patent: May 6, 2003

(54) DETECTOR APPARATUS AND METHOD

(75) Inventors: G. Dickey Arndt, Friendswood, TX (US); Phong H. Ngo, Friendswood, TX (US); James R. Carl, Houston, TX (US); Kent A. Byerly, Seabrook, TX (US); John Dusl, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/028,962

(22) Filed: Oct. 30, 2001

(65) Prior Publication Data

US 2002/0163346 A1 Nov. 7, 2002

Related U.S. Application Data

(60) Provisional application No. 60/252,040, filed on Nov. 17, 2000.

(51) Int. Cl.$^7$ .............................. G01V 3/08; G01V 3/10
(52) U.S. Cl. ........................................ 324/329; 324/233
(58) Field of Search ............................. 324/329, 326, 324/327, 328, 233, 262, 244; 342/22, 27, 192

(56) References Cited

U.S. PATENT DOCUMENTS

| | | | |
|---|---|---|---|
| 4,678,992 A | 7/1987 | Hametta | 324/208 |
| 4,709,213 A | 11/1987 | Podhrasky | 324/329 |
| 5,065,098 A | * 11/1991 | Salsman et al. | 324/326 |
| 5,537,041 A | 7/1996 | Candy | 324/329 |
| 5,565,771 A | 10/1996 | Hamelin et al. | 324/225 |
| 5,694,133 A | 12/1997 | Ghose | 342/372 |
| 5,715,320 A | 2/1998 | Allie et al. | 381/71.12 |
| 5,729,143 A | 3/1998 | Tavernetti et al. | 324/329 |
| 5,786,696 A | 7/1998 | Weaver et al. | 324/329 |
| 5,790,685 A | 8/1998 | Sallee | 382/100 |
| 5,969,528 A | * 10/1999 | Weaver | 324/329 |
| 6,150,810 A | * 11/2000 | Roybal | 324/244 |
| 6,163,292 A | 12/2000 | Liedtke et al. | 342/22 |

* cited by examiner

Primary Examiner—Edward Lefkowitz
Assistant Examiner—Subhash Zaveri
(74) Attorney, Agent, or Firm—James M. Cate

(57) ABSTRACT

Transceiver and methods are included that are especially suitable for detecting metallic materials, such as metallic mines, within an environment. The transceiver includes a digital waveform generator used to transmit a signal into the environment and a receiver that produces a digital received signal. A tracking module preferably compares an in-phase and quadrature transmitted signal with an in-phase and quadrature received signal to produce a spectral transfer function of the magnetic transceiver over a selected range of frequencies. The transceiver initially preferably creates a reference transfer function which is then stored in a memory. Subsequently measured transfer functions will vary depending on the presence of metal in the environment which was not in the environment when the reference transfer function was determined. The system may be utilized in the presence of other antennas, metal, and electronics which may comprise a plastic mine detector for detecting plastic mines. Despite the additional antennas and other metallic materials that may be in the environment due to the plastic mine detector, the magnetic transceiver remains highly sensitive to metallic material which may be located in various portions of the environment and which may be detected by sweeping the detector over ground that may contain metals or mines.

49 Claims, 6 Drawing Sheets

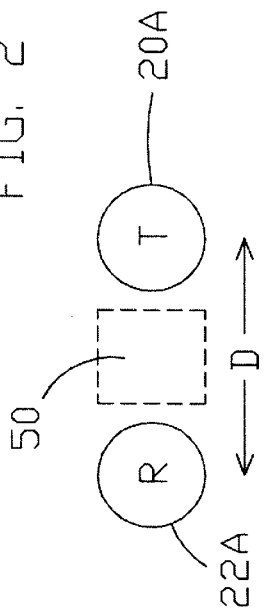
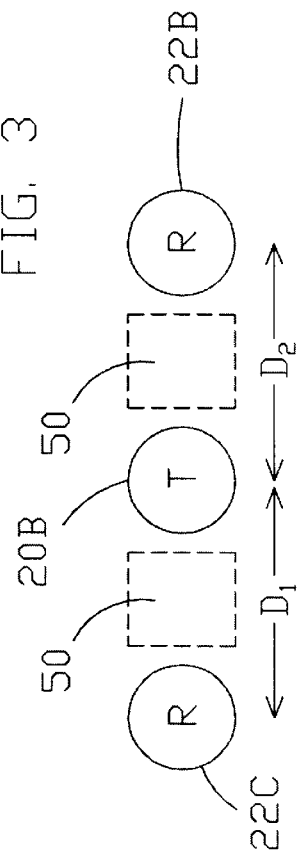
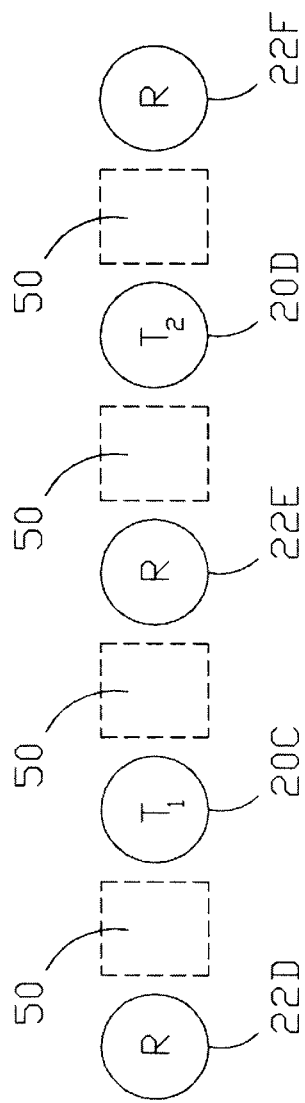

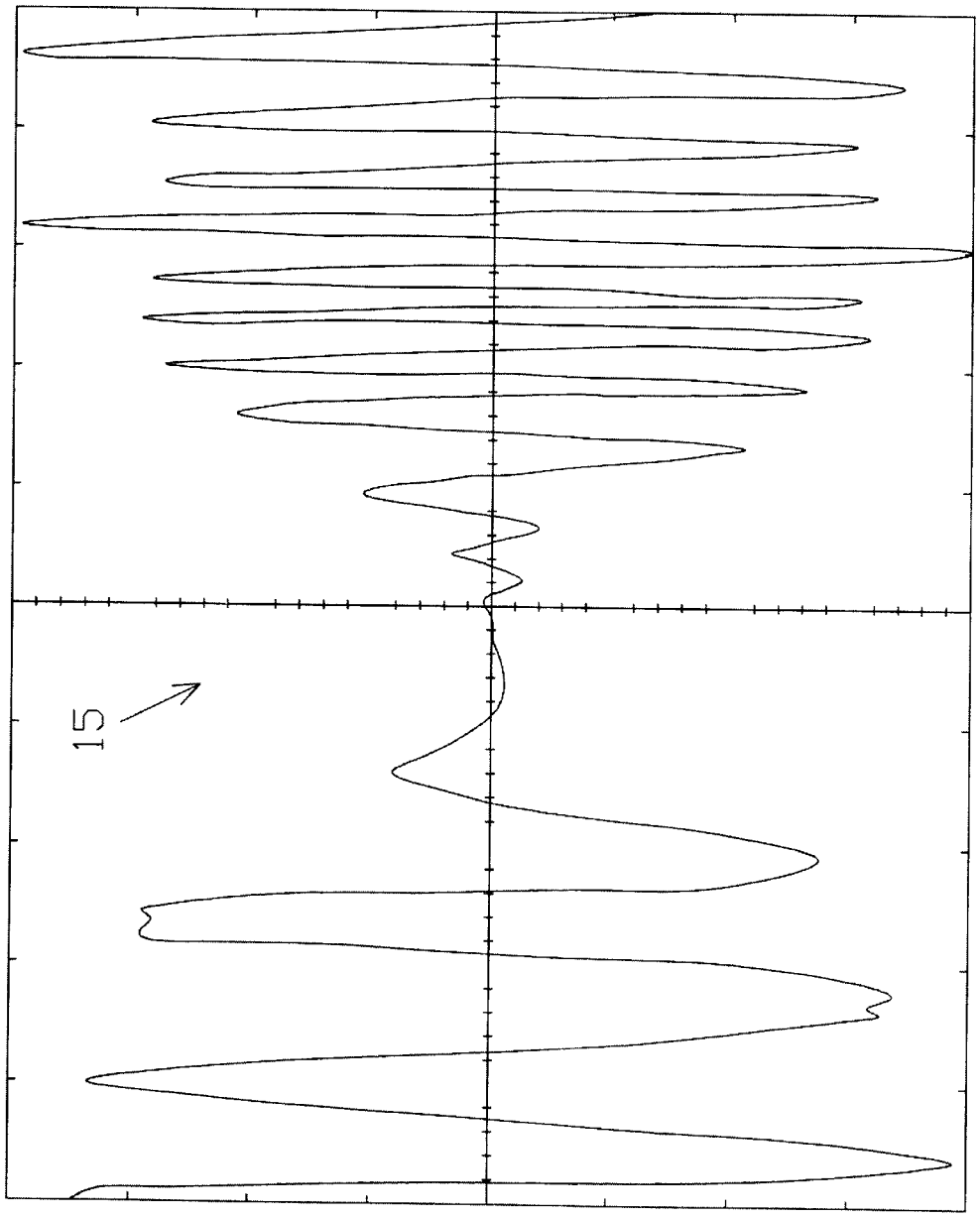

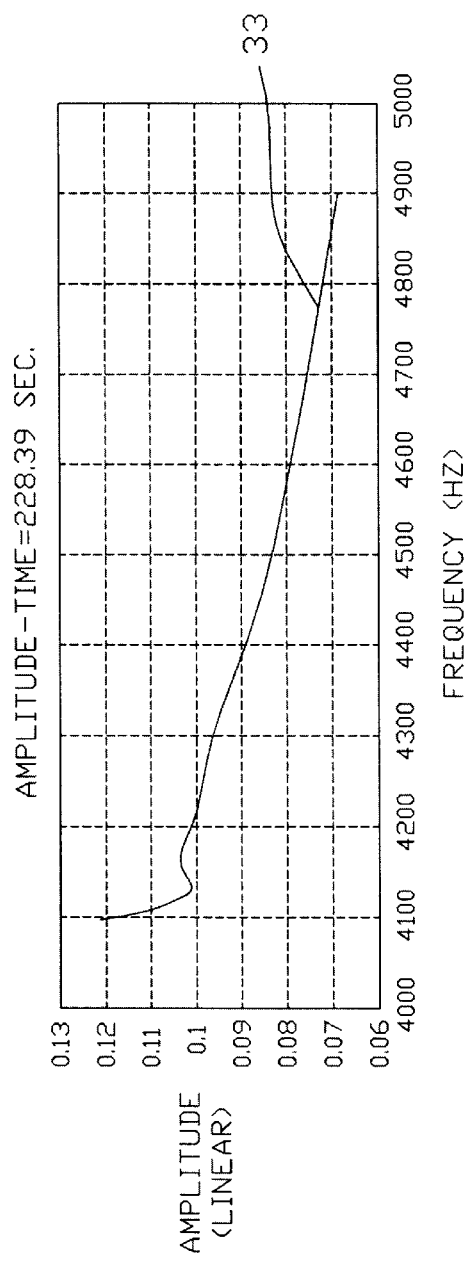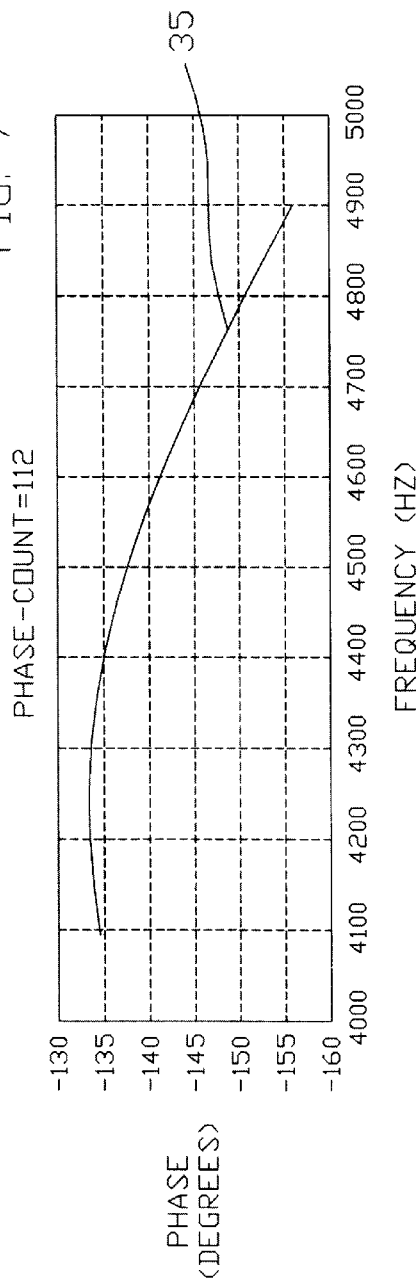

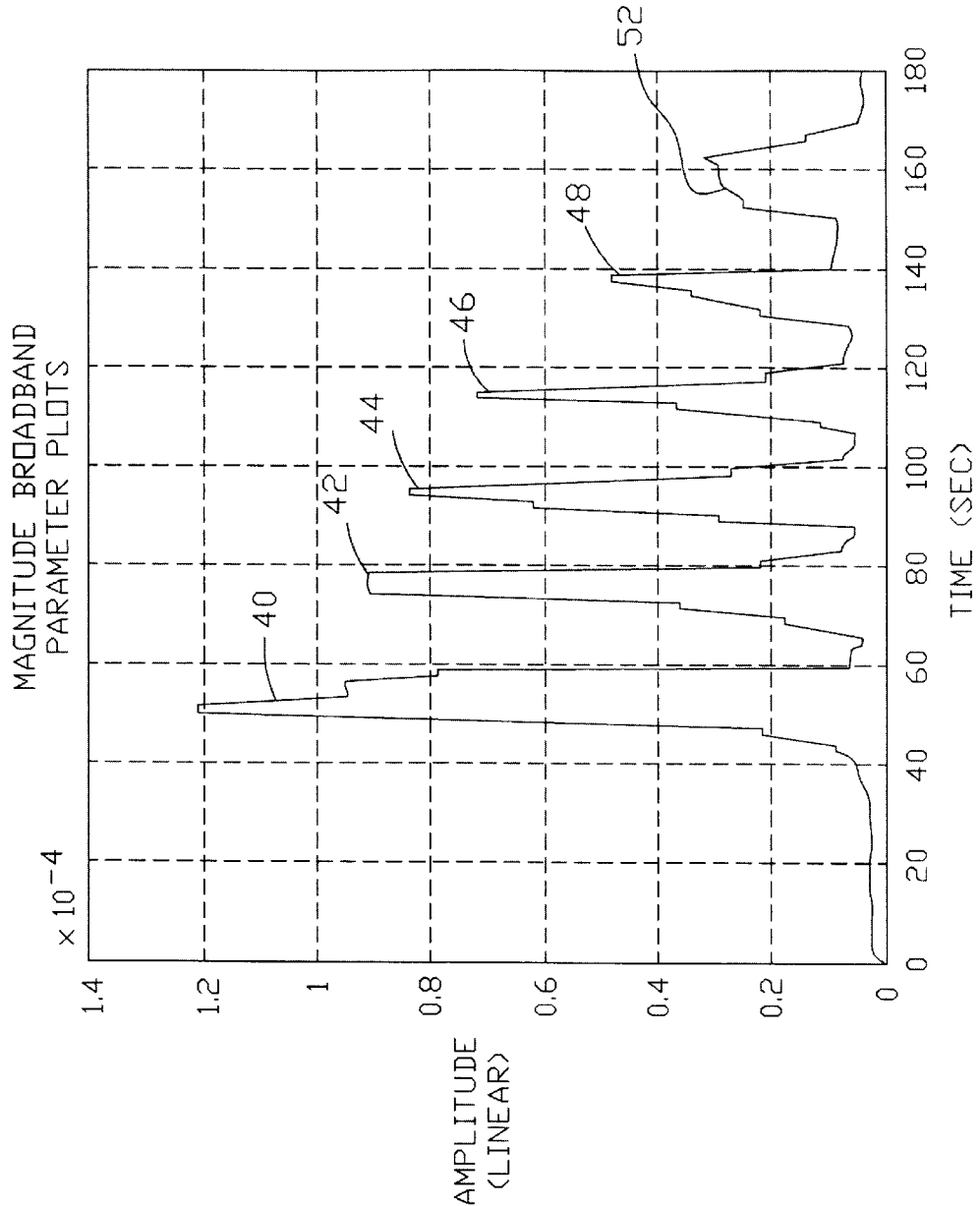

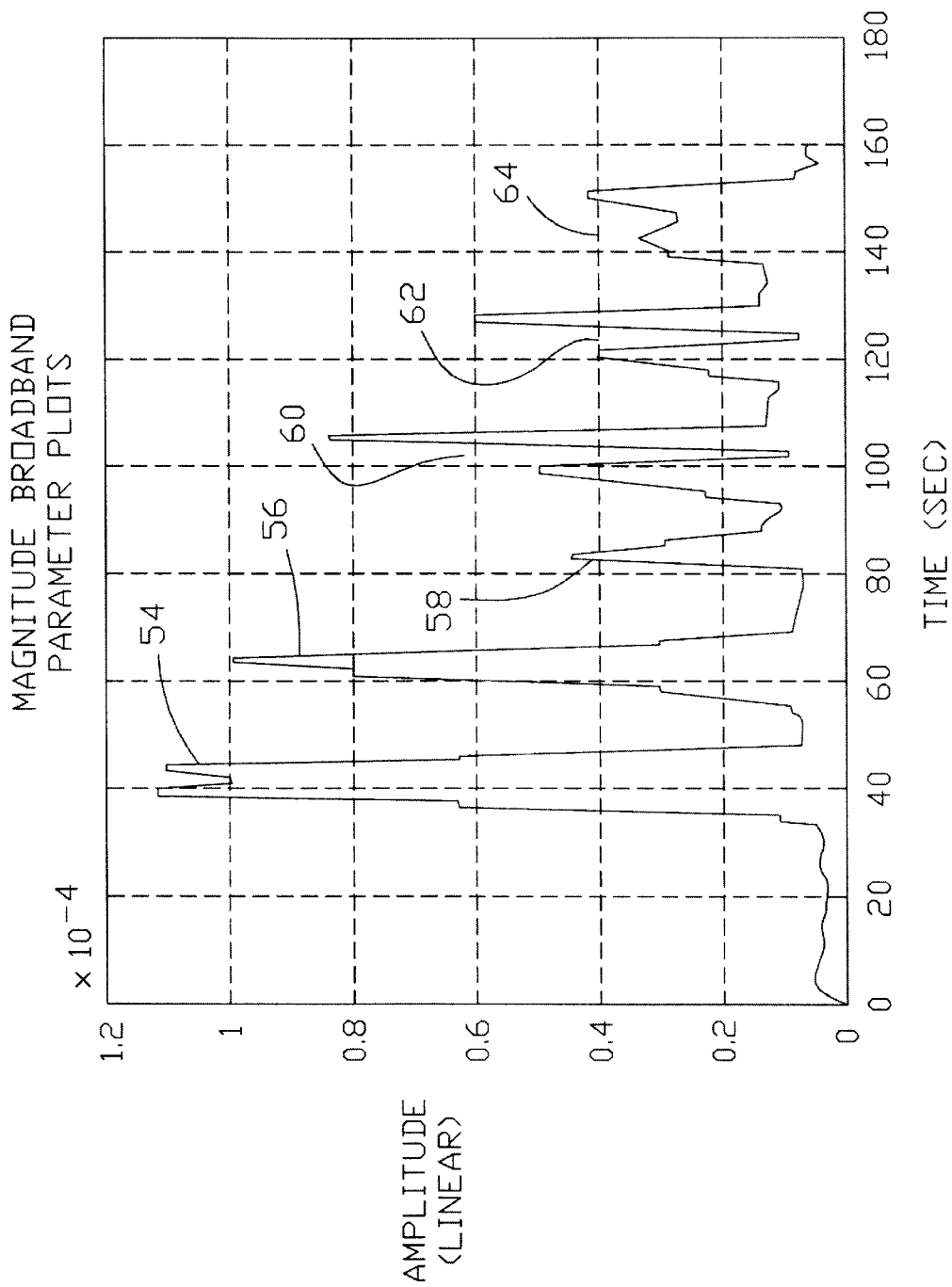

DETECTOR APPARATUS AND METHOD

This application claims benefit of U.S. Provisional Application No. 60/252,040, filed Nov. 17, 2000

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to detecting metal subterranean anomalies such as land mines and, more particularly, to the use of a digitally configured system for processing complex system transfer data utilizing one or more transmitter and receiver sets.

2. Description of Prior Art

On average, every twenty minutes someone in the world loses a limb to a landmine. Landmines may be made of plastic or metal. In just the Sinai desert and the West Bank of the Nile River, approximately 10,000,000 metal mines remain from World War II. Shifting sands and the like result in mines being widely displaced from their original locations. Thus, it is desirable that a mine detector be highly sensitive to permit location of small metal objects such as miniature mines at various depths. In fact, it would be desirable to provide a metal detector that is able to locate underground mines four or more times deeper than is believed now possible utilizing the most widely used prior art metal detector.

Moreover, it would be desirable to provide a landmine detector that may be utilized for detecting either plastic or metal land mines. U.S. application Ser. No. 09/056,363, filed Apr. 7, 1998, discloses an exemplary plastic mine detector. The present application discloses a very high sensitivity metal detector that may be utilized in conjunction with the exemplary plastic mine detector mentioned above or with other plastic detectors with little or no interference problems. Such interference problems may be produced by additional electronic components, antennas, metal connectors, or other metal objects, in the immediate vicinity of the metal detector, such as between transmitter/receiver coils, that otherwise result in transmitter and/or receiver noise and variations that create false signals.

Patent applications that show attempts to solve problems related to the above include the following:

U.S. Pat. No. 5,786,696, issued Jul. 28, 1998, to Weaver et al., discloses a metal detector which utilizes digital signal processing and a microprocessor to process buffers of information which is received at a periodic rate. Both high and low gain phase quadrature and in-phase signals are provided via a multiplexer to an analog-to-digital converter from a first receive antenna. A second receive antenna provides phase quadrature and in-phase signals also through the multiplexer to the analog-to-digital converter. The received signals are averaged, decimated and low pass filtered to eliminate noise and reduce the quantity of data which must be processed. A threshold (triggering) processing operation is performed to determine whether a valid target signal is present in the data. If not, no further processing is performed. The in-phase and quadrature components are processed using Fourier transforms to select a frequency band which includes the energy for the target signal. The energy in this frequency band is utilized to determine the identification of the target. The depth of the target is determined by comparing the quadrature phase components received from the first and second receive antennas. The size of the target is determined by reference to a look-up table based on the depth factor and the signal amplitude determined for the target object A display screen has a plurality of horizontal depth symbols, each of which has a plurality of size indicators and upon determining the depth and size of a target, one depth symbol is activated together with one of the size indicators to concurrently display this information to an operator.

U.S. Pat. No. 5,729,143, issued Mar. 17, 1998, to Tavernetti et al., discloses a metal detector which includes a receive coil and a transmit coil connected in an inductive bridge. To overcome imbalances in the bridge due for instance to misalignment of the coils or the presence of mineralization in the medium which is being examined, the metal detector automatically produces a nulling (bucking) signal to cancel out the effects of any unwanted receive coil signals detected during calibration. This nulling signal is a nulling current both in terms of level and phase, and its level and phase are determined during a calibration process prior to actual metal detection. By inclusion in the metal detector of a microprocessor (microcontroller) operating at a much higher frequency than the variations in the magnetic field used to detect metal, the nulling signal generation is performed with a high degree of time resolution, resulting a precision metal detector which adaptively ignores any unwanted signals.

U.S. Pat. No. 6,163,292, issued Dec. 19, 2000, to Liedtke et al., discloses a method of determining the ability of a medium to absorb electromagnetic waves including placing an antenna unit having spaced transmitting and receiving antennas on a limiting surface of a medium, emitting, with the transmitting antenna, a radar wave into the medium which is detected as a cross-signal by the receiving antenna, pre-processing and digitizing the cross-signal, and, thereafter, analyzing the cross-signal with an algorithm for determining the ability of the medium to absorb electromagnetic waves and, thereby, a type of the medium; and an electromagnetic sensor the operation of which is based on the method.

U.S. Pat. No. 6,150,810, issued Nov. 21, 2000, to Lyle G. Roybal, discloses a method for detecting a presence or an absence of a ferromagnetic object within a sensing area which may comprise the steps of sensing, during a sample time, a magnetic field adjacent the sensing area; producing surveillance data representative of the sensed magnetic field; determining an absolute value difference between a maximum datum and a minimum datum comprising the surveillance data; and determining whether the absolute value difference has a positive or negative sign. The absolute value difference and the corresponding positive or negative sign thereof forms a representative surveillance datum that is indicative of the presence or absence in the sensing area of the ferromagnetic material.

U.S. Pat. No. 5,969,528, issued Nov. 19, 1999, to Brent C. Weaver, discloses a metal detector which has multiple transmit and receive coils for producing multiple detection fields. In one embodiment, a transmit coil is combined with two receive coils in a configuration that enables the detector to generate two detection fields, one being substantially narrower than the other. The transmit coil is inductively balanced with the receive coils such that the transmit coil induces minimum signals in each of the two receive coils. A metal target lying within a detection field changes the coupling between transit and receive coils and produces signals in the receive coils. The received signals are utilized to identify the target's presence within one or both of the detection fields. The use of two detection fields, substantially different in size, enables the metal detector to search over a broad area for object detection and then narrow the search to more precisely locate the detected object. A further embodiment has two transit coils and one receive coil and likewise produces a broad and a narrow detection field.

U.S. Pat. No. 5,790,685, issued Aug. 4, 1998, to Bradley T. Sallee, discloses an invention which relates to the field of metal detectors. More particularly, it relates to an imaging metal detector for imaging the metal on subjects passing through a spatial plane providing the specific location, shape and mass of the metal object. This invention makes use of an array of active sensors to transmit and receive magnetic beams and a computer for generating an image of the metal object based upon the data received from the sensors. Through the use of this invention it is possible to scan several subjects at the same time and generate a two- or three-dimensional image of any metal object on the subject as well as precise location, mass and type of metal contained in the object.

U.S. Pat. No. 5,715,320, issued Feb. 3, 1998, to Allie et al., discloses an active adaptive control system which introduces a control signal from an output transducer to combine with the system input signal and yield a system output signal. An error transducer senses the system output signal and provides an error signal. An adaptive filter model has a model input from a reference signal correlated to the system input signal, and an output outputting a correction signal to the output transducer to introduce the control signal. Performance of the model is selectively controlled to control the signal sent to the output transducer. Various monitoring and control methods are provided, including spectral leak signal monitoring and control, correction signal monitoring and control, frequency responsive spectral transfer function processing of the leak signal and/or the correction signal, reference signal processing, and fuzzy logic control.

U.S. Pat. No. 5,694,133, issued Dec. 2, 1997, to Rabindra N. Ghose, discloses an invention which relates to automatic direction finding methods and systems for an electromagnetic or acoustic signal source by utilizing the concept of adaptive nulling of a narrow or wideband signal received by one sensor from the same signal received by the other, along with appropriate adjustments, in a two-sensors-interferometer. Plurality of sensors can be used to measure two orthogonal angles of arrival of a signal. Inventive methods and devices permit singling out a particular signal of interest among others by allowing a frequency tuning and selective amplification of the particular signal of interest without destroying the differential phase or time delay between the signals received by the sensors that determine the angle measurement. A high degree of signal cancellation during the adaptive nulling process permits a correspondingly high degree of accuracy and resolution for the angle measurement and also permits a relatively short baseline for the interferometer.

U.S. Pat. No. 5,565,771, issued Oct. 15, 1996, to Hamelin et al., discloses a magnetic testing device for detecting loss of metallic area and internal and external defects in elongated magnetically-permeable objects and includes a permanent magnet assembly having poles adapted to be spaced apart in the longitudinal direction of an elongated object for inducing a longitudinal magnetic flux in a section of the object between the poles of the magnet assembly, the magnet assembly being strong enough to magnetically saturate the section of the object. A tubular pole piece is arranged to surround the object adjacent each pole of the permanent magnetic assembly for directing the magnetic flux into the object at one pole and out of the object at the other pole. Hall effect devices are placed in the path of the magnetic flux for sensing the reduction of the flux passing through the elongated object due to any reduction of cross-sectional area of the elongated object between the pole pieces caused by loss of metallic area in the elongated object. A leakage flux sensor is installed between the pole pieces for detecting an external and internal defects in the objects. Circuitry is provided for increasing the linear resolution of the metallic area measurement of the object, whereby signals obtained correspond more closely to the variations in the metallic area of the elongated object. Preferably, the circuitry combines the local fault (LF) signal with the loss of metallic area (LMA) signal to benefit from both the high linear resolution of the LF signal and the long range stability of the LMA signal to improve the resolution of the LMA signal.

U.S. Pat. No. 5,537,041, issued Jul. 16, 1996, to Bruce H. Candy, discloses an invention which utilizes a method of an apparatus to perform metal discriminatory detection comprising the application of a multi period rectangular wave form to a transmitter coil, processing received signals by combining received components measured during different selected periods with respect to the transmitted signal in a manner based upon the predictable characteristics of ground constituents and thereby to provide an output signal which will be selectively indicative of a metal object within a target volume and substantially distinguishable from any signal arising from any electrically non-conducting ferrite in the target volume.

U.S. Pat. No. 5,065,098, issued Nov. 12, 1991, to Salsman et al., discloses a locating system which has its performance enhanced by the use of digital filtering. The locating system may include a transmitter for transmitting an electromagnetic signal from a concealed object. The locating system may also use electromagnetic signals from existing electromagnetic sources unrelated to the locator system. A receiver is provided for receiving a selected electromagnetic signal. The signal is subsequently converted from an analog signal into a digital signal and subjected to digital filtering. The resulting digital signal is then processed to provide location information about the concealed object.

U.S. Pat. No. 4,709,213, issued Nov. 24, 1987, to Robert J. Podhrasky, discloses a metal detector circuit which includes a transmit coil and a receive coil arranged in a balanced induction configuration in an electromagnetic field. The receive signal from the receive coil is input to electronic switches which receive quadrature reference inputs from a phase shift circuit. The phase demodulated outputs of the switches are passed through amplifiers and input to an analog-to-digital converter to produce digital signal samples which are transmitted through a bus. The bus is connected to random access memory and a read only memory which includes a stored signal processing program. A microprocessor is connected to the bus for receiving the digital signal samples and the stored program from memory. The microprocessor executes the stored signal processing program to produce a digital output signal which is transmitted through the bus to a digital-to-analog converter. The converter produces an analog output signal which is passed to an output driver circuit which produces a target indication signal at a speaker. The digital signal processing provided by the microprocessor includes concurrent ground cancellation and discrimination without the need for operator selection of these functions. The digital output produced by the microprocessor, upon detection of an object in the electromagnetic field, can be displayed in digital readouts.

U.S. Pat. No. 4,678,992, issued Jul. 7, 1987, to Allen W. Hametta, discloses a metal detector circuit comprising an oscillator capable of sensing any type of metal in motion over a predetermined frequency. The oscillator supply voltage is derived from a feedback correction circuit which compensates for stationary metal as well as metal moving in a lower frequency past the sensing coil of the oscillator by adjusting the supply voltage of the oscillator to make up for Q losses. The higher frequencies are blocked by a DC time constant (low pass filter) and the sensor coil is able to see through stationary metal and detect a moving metal target on the other side thereof. The amplitude of the modulated signal from the oscillator remains nearly constant throughout its detection range by this supply voltage feedback correction circuit. The detection circuit also provides a reliable output signal indicating when the sensor portion is damaged due to an open or shorted coil circuit.

The above applications do not show a highly sensitive, noise resistant, digitally-based magnetic transceiver with a unique configuration of transmitter/receiver coils for operating with other electronic equipment, such as a plastic mine detector, and utilizing a digitally derived spectral transfer function based on in-phase and quadrature signals. Those skilled in the art have long sought and will appreciate the present invention that addresses these and other problems.

SUMMARY OF THE INVENTION

Accordingly, the present invention provides a method operable for detecting materials, such as metal, within an environment utilizing a transceiver which may comprise one or more steps such as, for instance, digitally producing a transmit signal, transmitting the transmit signal through the environment, receiving a first received signal through the environment, digitizing the first received signal, determining reference digital data related to a reference transfer function of the transceiver for a magnitude and phase of the transmit signal and the first received signal, receiving a subsequent received signal through the environment, determining subsequent digital data related to a subsequent transfer signal of the transceiver for a magnitude and phase of the transmit signal and the subsequently received signal, and comparing the reference digital data to the subsequent digital data to detect the material.

The step of forming the reference transfer function may further comprise producing an estimated reference transfer function at each of a plurality of iterations, stacking a plurality of estimated reference transfer functions, and/or utilizing an in-phase and a quadrature replica of the magnitude and the phase of the transmit signal to determine the reference transfer function. Other steps may include iteratively determining a nulling signal which minimizes the power of the sum of the first received signal and the nulling signal and/or determining the reference transfer function utilizing a magnitude of an in-phase nulling signal and a magnitude of a quadrature nulling signal over a selected frequency range in combination with a phase of the in-phase nulling signal and a phase of the quadrature nulling signal.

The method may comprise determining the reference transfer function and the subsequent transfer function over a selected frequency spectrum, utilizing at least one transmit coil for the transmitting, utilizing at least one receive coil for the receiving, switching between at least two receive coils such that each receive coil has an associated reference transfer function and/or storing the reference transfer function in memory.

In another embodiment, the method may comprise one or more steps such as digitally producing a transmit signal, utilizing at least one transmit coil for transmitting the transmit signal through the environment, utilizing at least one receive coil for receiving a first received signal through the environment, digitizing the received signal, digitally forming a reference signal related to a magnitude and phase of the transmit signal and the first received signal over a frequency spectrum, storing the reference signal in a memory, receiving a second received signal through the environment, digitally forming a second signal related to a magnitude and phase of the transmit signal and the second received signal over the frequency spectrum, and comparing the reference signal to the second signal to detect the material wherein the reference signal is related to the reference spectral transfer function of the transceiver.

The method may further comprise initializing the transceiver by digitally forming the reference signal. The second signal is then related to a second transfer function of the transceiver determined after the initialization of the transceiver. Other steps may include digitally producing a periodic signal such as a sinusoidal sweep signal and may include amplitude modulating the sinusoidal sweep signal.

In yet another embodiment, the method may comprise one or more steps such as providing a plurality of transmit coils for transmitting at least one transmit signal through the environment, providing a plurality of receive coils for receiving at least one received signal through the environment, determining at least one digital reference signal related to at least one spectral transfer function corresponding to the at least one transmit signal and the at least one received signal, storing the at least one digital reference signal in memory, receiving at least one subsequently received signal through the environment, determining at least one subsequent digital signal related to at least one subsequent spectral transfer function corresponding to the at least one transmit signal and the at least one subsequently received signal, and comparing the at least one digital reference signal to the at least one subsequent digital signal to detect the material.

Other steps may comprise providing a first set of transmitter/receiver coils, providing a second set of transmitter/receiver coil, determining a first digital reference signal related to the first set of transmitter/receiver coils, and determining a second digital reference signal related to the second set of transmitter/receiver coils. Additionally, the method may comprise providing that the first set of transmitter/receiver coils is related to detecting the material in a first region of the environment, and providing that the second set of transmitter/receiver coils is related to detecting the material in a second region of the environment. In one embodiment the method may comprise providing that the first set of transmitter/receiver coils are offset from the second set of transmitter/receiver coils but are positioned within a plane common to both first set of transmitter/receiver coils and the second set of transmitter/receiver coils. Additionally, the method may comprise switching between the first set of transmitter/receiver coils and the second set of transmitter receiver coils.

Thus the present invention provides for a magnetic transceiver system for detecting material within an environment which may comprise one or more elements such as, for instance, a digital waveform generator to produce a digital transmit waveform, a digital-to-analog converter to convert the digital transmit waveform to an analog transmit signal, at least one transmit sensor for coupling the analog transmit signal to the environment, a receive sensor for receiving the analog transmit from the environment to provide an analog received signal, an analog-to-digital converter for converting the analog received signal to a digital received signal, a module for comparing the digital received signal with the digital transmit waveform to produce digital data related to a transfer function of the transceiver within a reference portion of the environment over a selected frequency range, a reference generator for storing reference digital data related to a reference transfer function of the transceiver over the selected frequency range, an error generator for comparing the reference digital data to a subsequently produced digital data related to a subsequently measured transfer function of the transceiver within a portion of the environment to be measured for the material.

Other elements of the invention may comprise an electronics section mounted between the at least one transmit coil and the at least one receive coil. The module may comprise a digital signal processor. The transceiver may comprise a first set of transmitter and receiver coils, and a second set of transmitter and receiver coils wherein the first set of transmitter and receiver coils is separately operable from the second set of transmitter and receiver coils.

Other elements may comprise an audio module connected to the error generator and/or a current driver amplifier for driving the at least one transmit sensor.

An object of the present invention is to provide an improved metal detector that may be utilized in an environment with other electronic equipment.

This and other objects, features, and advantages of the present invention will become apparent from the drawings, the descriptions given herein, and the appended claims. It will be understood that any listed objects of the invention are intended only as an aid in understanding aspects of the invention and are not intended to limit the invention in any way.

BRIEF DESCRIPTION OF THE DRAWINGS

FIG. 2 is a schematic showing a simple receiver/transmitter coil arrangement in accord with the present invention;

FIG. 3 is a schematic showing a dual receiver/transmitter coil arrangement in accord with the present invention;

FIG. 4 is a schematic showing a multiple receiver/transmitter coil arrangement in accord with the present invention;

FIG. 5 is a waveform diagram of a presently preferred, digitally-produced, transmitter chirp signal in accord with the present invention;

FIG. 6 is a digitally created amplitude transfer function in accord with the present invention;

FIG. 7 is a digitally created phase transfer function in accord with the present invention;

FIG. 8 is a schematic showing a response versus time position of a transceiver in accord with the present invention with simulated circuit boards located between the coils for detecting multiple 2.5 inch metal mines located at various depths; and FIG. 9 is a schematic showing a response versus time position of a transceiver in accord with the present invention with simulated circuit boards and 1.5 pounds of metal located between the coils for detecting the same multiple 2.5 inch metal mines of FIG. 8 located at various depths.

Figure 1:
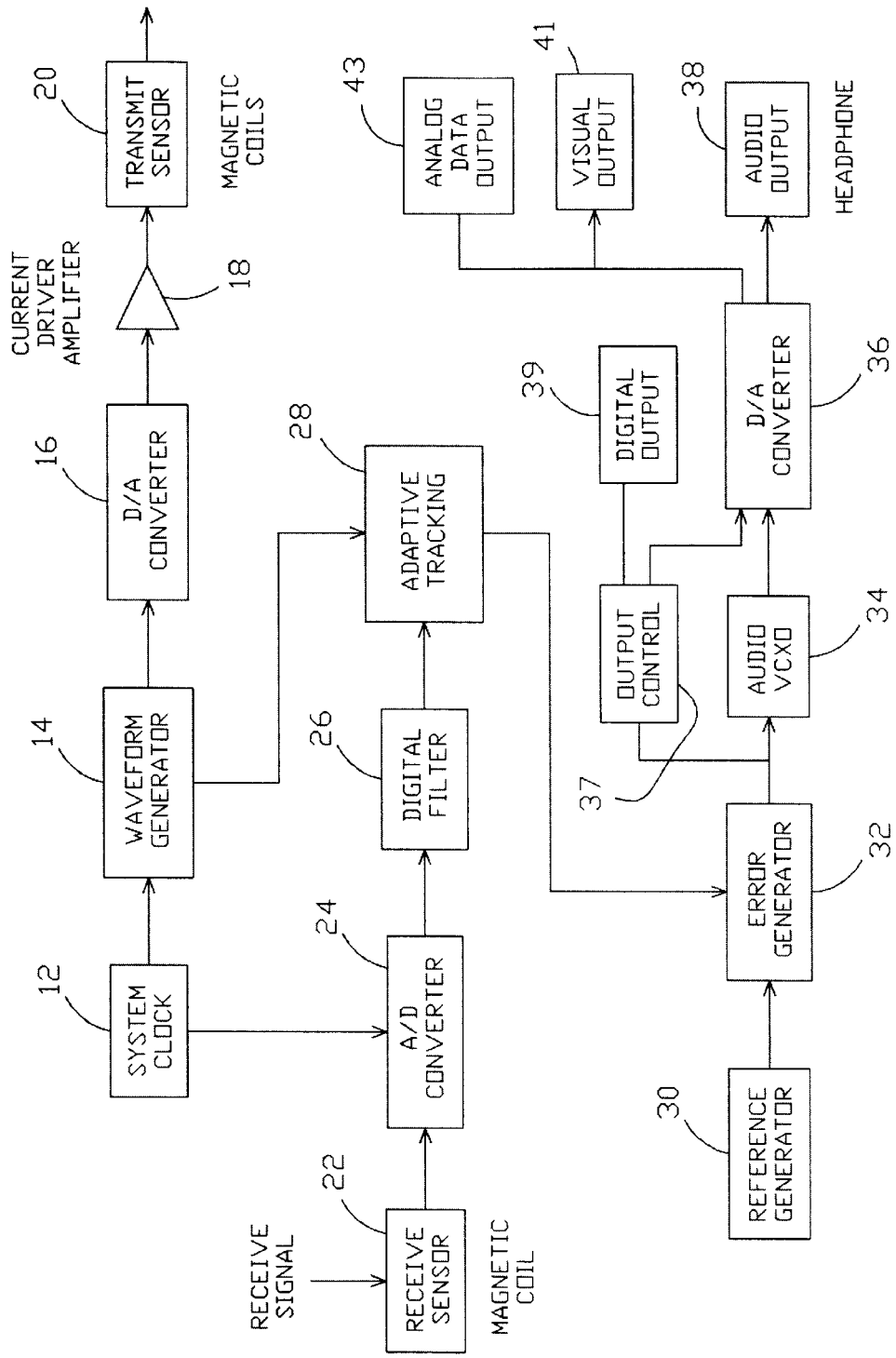
FIG. 1 is a schematic of a block diagram showing a presently preferred apparatus for transmitting and receiving signals in accord with the present invention.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PREFERRED EMBODIMENTS

Referring now to the drawings and, more particularly, to FIG. 1 there is shown a system block diagram for a presently preferred transceiver/processor 10 in accord with the present invention. System clock 12 provides a common clock signal for the transmitter and receiver circuits. Waveform generator 14 may be a digital signal processor, such as a Texas Instruments TMS320C6701 or other suitable component. In a presently preferred embodiment, waveform generator 14 is digitally based and utilized to produce a desired periodic broadband output signal. In a preferred embodiment, the periodic output signal is a linear phase sinusoidal sweep, or chirp 15 such as that shown in FIG. 5. Chirp 15 is amplitude modulated using an envelope generator to thereby minimize transient effects on transceiver system 10. However, transceiver 10 is not dependent on any particular type of output waveform. Thus, chirp 15 is used for convenience and other waveforms could also be utilized. Waveform generator 14 is digital and can therefore be utilized to produce an identical output waveform repeatably over time without need for adjustment or calibration.

Digital-to-Analog (D/A) converter 16 transforms the digital waveform into an analog waveform which is then amplified by current amplifier 18 and applied to one or more transmitter coils 20. Various transmitter/receiver configurations are shown in FIG. 2, FIG. 3, and FIG. 4 and are discussed subsequently. Current amplifier 18 is less subject to external voltage noise than a voltage amplifier and therefore reduces noise that might be included in the transmitted signal.

One or more receive sensors or coils 22 receive the signal produced by the one or more transmitter sensors or coils 20 due to coupling through the environmental surroundings. The received signal will typically look very much the same as transmitter signal, which may be chirp 15 shown in FIG. 5, except for lower amplitude and small changes in phase that are not normally detectable to the naked eye but which contain small differences which the computer can detect and process in accord with the processing technique of the present invention as discussed subsequently.

The received signal from receiver sensor 22 is amplified by a high gain amplifier and is then converted to a digital signal by Analog-to-Digital (A/D) converter 24. Digital filter 26 is preferably utilized for initial processing of the signal to remove transients and noise.

A processor, such as the DSP processor discussed above, is utilized for operation of adaptive tracking module 28. Transceiver 10 uses an in-phase and quadrature replica of transmitted periodic chirp 15 to measure the phase and magnitude of the receiver input signal over the period of the chirp transmission. This process is based on an adaptive nulling signal, which is constructed using a parametric sum of the in-phase and quadrature signals. The magnitude and phase of the spectral transfer function of transceiver 10 is estimated over the frequency range of the chirp by using the magnitudes of the in-phase and quadrature nulling signal. The transfer function magnitude is constructed using the square root of the sum of the squares and the transfer function phase is constructed using the arc tangent of the quadrature component divided by the in-phase component. The present invention utilizes a reference transfer function of the system that is compared to each subsequently measured transfer function of the system as a preferred basic technique of detecting metal whereby changes in the environment result in an altered transfer function.

The nulling system preferably operates in a Least Mean Squares sense and the measured spectral transfer function is preferably a Least Mean Squares estimate which thereby preferably finds a minimum or zero crossing related to the transfer function and may be referred to as an LMS adaptive algorithm. Since the adaptive nulling is a time dependent process, multiple sweeps of the periodic signal can be constructively combined to improve system performance. This technique is more commonly known as data stacking. In essence, as data is stacked or added together the consistent signals are reinforced but the inconsistent signals, such as Gaussian noise, are not reinforced. Thus, the reference spectral transfer function is constructed by stacking (or averaging) multiple estimates of the transfer function, which are generated by LMS adaptive processing module 28. By measuring the known reference environment multiple times, and stacking the resultant spectral transfer function data, a high precision reference can be constructed. Thus, in one presently preferred embodiment, coherent stack is utilized for improving the Signal to Noise Ratio (SNR). More precisely, for coherent stacking in white Gaussian noise, the noise power is reduced by the square root of the number of the transfer function estimates stacked together. To further enhance mine detection, estimates are generated by subtracting the reference transfer function from subsequent estimates of the transfer function and post processing the differential data in a manner which optimizes the detection of land mines.

Thus the present invention preferably utilizes an iterative process to estimate and further refine the reference transfer function such that $$d(n)=m(n)-r(n),$$

where r(n) is the reference transfer function at step n, m(n) is the measured reference transfer function at step n, and d(n) is the difference such that d(n) approaches zero as the number of iterations n increases.

FIG. 6 discloses an example of a digitally constructed reference amplitude transfer function 33 over a selected frequency range in accord with the method of the invention. Likewise, FIG. 7 discloses an example of a digitally constructed reference phase transfer function 35 over the same frequency range. Reference amplitude transfer function 33 and reference phase transfer function 35 are related to the input/output ratio of transceiver 10, i.e., the transmitted signal from transmit sensor 20 and the received signal from receive sensor 22. The frequency spectrum or span shown in FIG. 6 and FIG. 7 is from 4 to 5 KHz. However, other frequency spectrums, spans, or intervals, may be utilized, such as those in the audio range, and depend on the application. Thus in operation, subsequently produced phase/amplitude transfer plots or functions are effectively generated in adaptive tracking module 28 and then digitally compared in error generator 32 to one or more previously generated and stored reference transfer plots or functions from reference generator 30.

Thus, the processing algorithm upon initialization constructs the low noise transfer function reference by comparing the digital input waveform produced by waveform generator 14 with the digital output waveform from A/D converter 24. The resultant reference spectral transfer function so produced is then stored in reference generator 30 for future use. All subsequent transfer function measured by adaptive tracking module 28 are compared in error generator 32 to the reference transfer function stored in reference generator 30. An error signal is then generated by a comparison technique, such as for instance, the accumulated sum of the difference between the reference transfer function and the current measurement over the frequency range of the chirp. This error signal can then be used to derive a control signal into audio voltage controlled oscillator (VCXO) 34 which changes frequency according to the amount of error generated by the transfer function comparison. VCXO 34 output may be monitored by the user of the system for detecting metal. In one preferred embodiment, D/A converter 36 and audio output 38 utilize the frequency change to produce an output that comprises a number of audio tones whereby the number of tones produced is responsive to the error generated, e.g., more tones are produced when the error signal is larger. This audio tone is heard in one-side (ear) of a headphone. The number of tone changes determines the maximum detection response. Outdoor tests were recently conducted using the small metal mine and a 1-inch nail to simulate the detonator in a PMD-6 mine. The system utilized a preset relationship between the number of tones produced and the amount of error detected. In this test, with the small 2.5 inch metal mine, 10 tones were produced with the mine at a 4 inch depth, 8 tones were produced with the same type mine at a 6 inch depth, 3 tones were produced with the same type of mine at an 8 inch depth, 3 tones were produced with the same type of mine at a 10 inch depth, and 2 tones were produced for the same type of mine at a 12 inch depth. With the 1-inch nail, 3 tones were produced with the nail buried at a 4-inch depth, and 2 tones were produced with the nail at a 6-inch depth. The experimental results demonstrate the viability of this approach over a broad range of operating frequencies, bandwidths, and metal targets. Further optimization of the frequency bandwidth and other operating parameters for the detector are expected to further extend the detection depth of a target and to reduce the minimum detectable target size.

Other types of monitors, e.g., a laptop computer interface or other processor, could also be utilized for monitoring error generator 32 output for system 10. For instance, output control 37 may be provided to supply various types of outputs as desired. Output 37 may utilize D/A converter 36 to produce visual display output 41 and/or provide analog data output 43. Visual display 41 may typically be more sensitive than the audio tone technique. Analog output 43 may be provided with various types of analog high frequency, low frequency, band pass filters, hi-Q filters, amplifiers, and the like for analog signal processing purposes. Output control 38 may also provide a digital data signal for digital output 39 that may be utilized by a digital data processor to further analyze the error generator data. Alternatively, the raw data from adptive tracking module 28 and reference generator 30 may be used as data outputs for further analysis.

FIG. 8 and FIG. 9 show test results wherein a laptop computer is utilized for displaying DSP or error generator 32 outputs. FIG. 8 shows responses for six 2.5-inch mines spaced apart and buried at different depths. The detector is moved over the test bed at a selected distance/sec and so the bottom scale in terms of seconds is effectively equivalent to distance traveled. The first target, buried at one inch, is indicated by peak 40. The second target, buried at two inches, is indicated by peak 42. The third target, buried at three inches, is indicated by peak 44. The fourth target, buried at four inches, is indicated by peak 46. The fifth target, buried at five inches, is indicated by peak 48. The sixth target, buried at approximately six inches is indicated by peak 52. For these tests, two copper circuit boards were placed between the coils to simulate the electronics for a plastic mine detector. For instance, in FIG. 2, FIG. 3, and FIG. 4, one or more simulated electronics sections 50, could be placed between the coil configurations as indicated. Adaptive tracking reference module 28 then constructs a reference transform, as discussed above, wherein the interference created by the simulated electronics is built into the reference transform. In FIG. 9, a similar test is run while utilizing a 1.5 pound piece of metal is placed atop the two copper circuit boards that form simulated electronics sections 50. The results, with peaks 54, 56, 58, 60, 62, and 64, show that any metallic objections between the coils (which is the most sensitive area) can be readily calibrated out by adaptive tracking or nulling module 28. Thus, tests performed with and without copper plates and the 1.5 lb. of iron between the coils give the same or similar results.

Deep target depths were the focus for another series of tests in a sandy beach wherein the conditions included damp sand. The system easily detected a three inch mine buried six inches in the sand, a seven inch mine buried twelve inches in the sand, and a nine inch plate buried between eighteen and thirty inches in the sand. Many tones were produced by the three-inch mine and the six inch mine. The nine-inch mine, when buried at eighteen inches, produced many tones. When buried at twenty-four inches, the nine-inch mine produced four tones. When buried at thirty inches, the nine-inch mine produced two tones. However, with system optimization such as transmitter/receiver spacing, deeper depths of investigation are possible.

In the tests above, a five coil system configuration such as shown in FIG. 4 was utilized with three transmit coils and two receiver coils. A five inch diameter first transmit coil had 45 turns of #20 gauge wire and a DC resistance of 0.9 ohms. A first five inch diameter receive coil had 800 turns of #32 gauge wire and a DC resistance of 160 ohms. A second five inch diameter transmit coil had 90 turns of #20 gauge wire and a DC resistance of 1.8 ohms. A third sixteen inch diameter transmit coil had 32 turns of #20 gauge wire and a DC resistance of 1.7 ohms. A second sixteen inch receive coil had 800 turns of #32 gauge wire and a DC resistance of 538 ohms.

Thus, system 10 can have other configurations rather than just one receive coil 22A and one transmit coil 20A as shown in FIG. 2. For instance, as shown in FIG. 3, there may be one transmit coil 20B and two receive coils 22B and 22C. The digital signal processor could switch between the two receive signals if desired and compare the result with two previously stored reference tranforms. However, the combination of signals from both receivers could also be utilized simultaneously by determining the reference transform of the transmitter and both receivers. As another alternative, the system could switch between each coil individually and then utilize both receive coils simultaneously thereby providing the possibility for three different possible transfer functions for the system. As well, transmit coil 20B might be located on one side of the array such that the spacing between transmit coil 20B is different with respect to receive coil 22C and 22B whereby one receive coil would read more deeply than the other.

A linear array of transmit/receive coils could be formed to provide a wide continuous sweep across the terrain of interest with one example being shown in FIG. 4. The coil configuration of FIG. 4 includes two transmit coils 20C and 20D, and three receive coils 22D, 22E, and 22F. The coils may be switched in numerous different possibilities. However, as discussed above, the system with all transmitters and receivers could also operate simultaneously with one transfer function determined for all coils. Thus, with three receive coils, and two transmit coils, a plurality of different reference and measured transfer functions could be utilized, e.g. either transmit coil could be utilized with either receive coil, either transmit coil could be utilized with any pair of receivers, either transmit coil could be utilized with all three receive coils, any receive coil could be utilized with both transmit coils, etc. This operation permits for a wide range of regions scanned, depths scanned, and so forth to permit more accurate target location and size information to be provided.

The sensors could also be combined such that one coil is behind the other to provide both deep scanning and shallow scanning in the same sweep. This latter mechanism would also serve as a safety mechanism in that two sensors would cover most of the same area, thereby minimizing the chances of missing a mine. In another alternative, after a metal object was detected with a deeper spacing, then a second sensor configuration might switched on to better define the size, shape, and depth of the object whereby one or more electronics sections 50 would provide suitable switching.

Thus, various configurations and sizes of transmitters and shapes can be utilized as shown in FIG. 2, FIG. 3, and FIG. 4 which are only examples of various possible configurations. If the target size and depth range are known, then the coils can be designed for those particular targets. However, with different size and spacing of coils, different targets and depths can be detected. In FIG. 2, FIG. 3, and FIG. 4, the coils are in the same or parallel planes and offset from each other. However, larger coils may be located within or overlapping with smaller coils, and the like.

Transceiver 10 could also be used for precious metal detection within existing gold or silver mines. Since the present invention has greater depth penetration than existing detectors, it could also be utilized for locating ore veins deep within the soil or quartz geological structures. If desired, transceiver 10 could also be used for detecting relatively conductive materials within an environment that contains less conductive materials. If calibrated appropriately and utilizing a variable output, transceiver 10 could be utilized for making measurements of material properties such as average conductivity/resistivity readings of a volume of homogeneous material or to detect more or less conductive materials within an environment.

In one preferred mode of operation, transceiver 10 is initialized by determining a reference spectral transfer function of the transceiver related to the magnitude and phase of the transmitted signal and the received signal. This process effectively nulls out the effect of metal, such as electronics sections and antennas, that may be utilized in conjunction with transceiver 10. For instance, transceiver 10 may be operated in conjunction with a plastic mine detector. After a reference spectral transfer function is determined, then transceiver 10 produces subsequently measure spectral transfer functions. Since the environment, such as the ground, affects the spectral transfer function of transceiver 10, changes in the environment during operation are detected. Thus, transceiver 10 is preferably swept over the ground in which metal mines may be located to thereby locate metallic mines.

While the preferred embodiments of the system and method are disclosed in accord with the law requiring disclosure of the presently preferred embodiment of the invention, combinations of the elements and/or methods disclosed may also be used. Processing means including non-visual processing means may be used to indicate the probability of a mine by detecting unique characteristics of the signal. Therefore, the foregoing disclosure and description of the invention are illustrative and explanatory thereof, and various changes in the method steps and also the details of the apparatus may be made within the scope of the appended claims without departing from the spirit of the invention.

What is claimed is:

1. A method operable for detecting material within an environment utilizing a transceiver, comprising:
   digitally producing a transmit signal;
   transmitting said transmit signal through said environment;
   receiving a first received signal through said environment;
   digitizing said first received signal;
   determining reference digital data related to a reference transfer function of said transceiver for a magnitude and phase of said transmit signal and a magnitude and phase of said first received signal;
   receiving a subsequent received signal through said environment;
   determining subsequent digital data related to a subsequent transfer signal of said transceiver for said magnitude and phase of said transmit signal and a magnitude and phase of said subsequently received signal; and
   comparing said reference digital data to said subsequent digital data to detect said material.

2. The method of claim 1, further comprising:
   determining said reference transfer function and said subsequent transfer function over a selected frequency spectrum.

3. The method of claim 1, further comprising:
   utilizing at least one transmit coil for said transmitting.

4. The method of claim 1, further comprising:
   utilizing at least one receive coil for said receiving.

5. The method of claim 1, wherein said step of forming said reference transfer function further comprises producing an estimated reference transfer function at each of a plurality of iterations.

6. The method of claim 5, further comprising:
   stacking a plurality of estimated reference transfer functions.

7. The method of claim 1, further comprising:
   switching between at least two receive coils such that each receive coil has an associated reference transfer function.

8. The method of claim 1, further comprising:
   storing said reference digital data related to said transfer function in memory.

9. The method of claim 1 further comprising:
   utilizing an in-phase and quadrature replica of said magnitude and said phase of said transmit signal to determine said reference digital data related to said reference transfer function.

10. The method of claim 9, further comprising:
    iteratively determining a nulling signal which minimizes the power of the sum of said first received signal and said nulling signal.

11. The method of claim 10, further comprising:
    determining said reference digital data related to said reference transfer function utilizing a magnitude of an in-phase nulling signal and a magnitude of a quadrature nulling signal over a selected frequency range in combination with a phase of said in-phase nulling signal and a phase of said quadrature nulling signal.

12. A method of detecting material within an environment utilizing a transceiver, comprising:
    producing a transmit signal;
    utilizing at least one transmit coil for transmitting said transmit signal through said environment;
    utilizing at least one receive coil for receiving a first received signal through said environment;
    digitizing said received signal;
    digitally forming a reference signal related to a magnitude and phase of said transmit signal and said first received signal over a frequency spectrum;
    storing said reference signal in a memory;
    receiving a second received signal through said environment;
    digitally forming a second signal related to a magnitude and phase of said transmit signal and said second received signal over said frequency spectrum; and
    comparing said reference signal to said second signal to detect said material.

13. The method of claim 12, wherein said reference signal is related to a reference spectral transfer function of said transceiver.

14. The method of claim 13, further comprising initializing said transceiver by digitally forming said reference signal.

15. The method of claim 14, wherein said second signal is related to a second transfer function of said transceiver determined after said initialization of said transceiver.

16. The method of claim 12, wherein said producing of said transmit signal further comprises:
    digitally producing a periodic signal.

17. The method of claim 16, further comprising:
    producing a sinusoidal sweep signal.

18. The method of claim 17, further comprising:
    amplitude modulating said sinusoidal sweep signal.

19. The method of claim 12, further comprising:
    determining an in-phase transmit signal and a quadrature transmit signal, and
    determining an in-phase receive signal and a quadrature receive signal.

20. The method of claim 19, further comprising:
    utilizing said in-phase transmit signal and said quadrature transmit signal in combination with said in-phase receive signal and said quadrature receive signal to produce a nulling signal.

21. The method of claim 20 further comprising:
    varying said nulling signal to minimize the power of a sum of said receive signal and said nulling signal.

22. The method of claim 12, further comprising:
    providing a first set of transmitter/receiver coils,
    providing a second set of transmitter/receiver coil, digitally forming a first reference signal related to said first set of transmitter/receiver coils, and digitally forming a second reference signal related to said second set of transmitter/receiver coils.

23. A method of detecting material within an environment utilizing a transceiver, comprising:

providing a plurality of transmit coils for transmitting at least one transmit signal through said environment;

providing a plurality of receive coils for receiving at least one received signal through said environment;

determining at least one digital reference signal related to at least one spectral transfer function corresponding to said at least one transmit signal and said at least one received signal;

storing said at least one digital reference signal in a memory;

receiving at least one subsequently received signal through said environment;

determining at least one subsequent digital signal related to at least one subsequent spectral transfer function corresponding to said at least one transmit signal and said at least one subsequently received signal; and comparing said at least one digital reference signal to said at least one subsequent digital signal to detect said material.

24. The method of claim 23, further comprising:

providing a first set of transmitter/receiver coils, providing a second set of transmitter/receiver coil, determining a first digital reference signal related to said first set of transmitter/receiver coils, and determining a second digital reference signal related to said second set of transmitter/receiver coils.

25. The method of claim 24, further comprising:

providing that said first set of transmitter/receiver coils is related to detecting said material in a first region of said environment, and providing that said second set of transmitter/receiver coils is related to detecting said material in a second region of said environment.

26. The method of claim 24, further comprising:

providing that said first set of transmitter/receiver coils are offset from said second set of transmitter/receiver coils but are positioned within a plane common to both first set of transmitter/receiver coils and said second set of transmitter/receiver coils.

27. The method of claim 24, further comprising:

switching between said first set of transmitter/receiver coils and said second set of transmitter/receiver coils.

28. The method of claim 23, further comprising:

utilizing a magnitude and a phase over a frequency range related to said at least one transmit signal and said at least one received signal for determining said at least one digital reference.

29. The method of claim 23, further comprising:

utilizing an in-phase and quadrature signal related to said at least one transmit signal and said at least one received signal for determining said at least one digital reference.

30. The method of claim 23, further comprising:

positioning an electronics section between at least one of said plurality of transmit coils and at least one of said plurality of receive coils.

31. A magnetic transceiver system for detecting material within an environment, comprising:

a digital waveform generator to produce a digital transmit waveform;

a digital-to-analog converter to convert said digital transmit waveform to an analog transmit signal;

at least one transmit sensor for coupling said analog transmit signal to said environment;

a receive sensor for receiving said analog transmit from said environment to provide an analog received signal;

an analog-to-digital converter for converting said analog received signal to a digital received signal;

a module for comparing said digital received signal with said digital transmit waveform to produce digital data related to a transfer function of said transceiver within a reference portion of said environment over a selected frequency range;

a reference generator for storing reference digital data related to a reference transfer function of said transceiver over said selected frequency range;

an error generator for comparing said reference digital data to a subsequently produced digital data related to a subsequently measured transfer function of said transceiver within a portion of said environment to be measured for said material.

32. The transceiver system of claim 31, wherein said receive sensor further comprises at least one receive coil.

33. The transceiver system of claim 32, further comprising:

an electronics section mounted between said at least one transmit coil and said at least one receive coil.

34. The transceiver system of claim 31, wherein said module comprises a digital signal processor.

35. The transceiver system of claim 31, further comprising:

a first set of transmitter and receiver coils, and a second set of transmitter and receiver coils.

36. The transceiver system of claim 35, wherein said first set of transmitter and receiver coils is separately operable from said second set of transmitter and receiver coils.

37. The transceiver of claim 31, further comprising:

an audio module connected to said error generator.

38. The transceiver of claim 31, further comprising:

a current driver amplifier for driving said at least one transmit sensor.

39. The transceiver of claim 31, wherein said transmit sensor comprises at least two transmit coils and wherein said receive sensor comprises at least two receive coils, said receive coils having more than ten times as many turns as said transmit coils.

40. The transceiver of claim 31, wherein said transmit sensor comprises one transmit coil and said receive sensor comprises two receive coils.

41. The transceiver of claim 40, wherein said one transmit coil and said two receive coils lie in the same plane with respect to each other.

42. The transceiver of claim 31, wherein said transmit sensor comprises two transmit coils and said receive sensor comprises three receive coils.

43. The transceiver of claim 42, wherein said two transmit coils and said three receive coils lie in the same plane with respect to each other.

44. The transceiver of claim 31, wherein said transmit sensor may comprise any number of transmit coils and said receive sensor may comprise any number of receive coils.

45. The transceiver of claim 44, wherein said any number of transmit coils and said any number of receive coils may be operated simultaneously.

46. The transceiver of claim 44, wherein said any number of transmit coils and said any number of receive coils may be combined in sets wherein each set is associated with a respective reference digital data related to a respective transfer function.

47. The transceiver of claim 31, further comprising a system clock to provide a clock signal to said digital waveform generator and said analog-to-digital converter.

48. The transceiver system of claim 31, further comprising:

a plastic mine detector instrument section.

49. The transceiver system of claim 31, further comprising:

a visual indicator for displaying an output of said error generator.

* * * * *